(12) United States Patent
Vaarno et al.

(10) Patent No.: US 10,030,285 B2
(45) Date of Patent: Jul. 24, 2018

(54) SOLVENT EXTRACTION SETTLER ARRANGEMENT

(71) Applicant: OUTOTEC (FINLAND) OY, Espoo (FI)

(72) Inventors: Jussi Vaarno, Sundsberg (FI); Rami Saario, Espoo (FI); Henri Fredriksson, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 426 days.

(21) Appl. No.: 14/896,051

(22) PCT Filed: May 28, 2014

(86) PCT No.: PCT/FI2014/050425
§ 371 (c)(1),
(2) Date: Dec. 4, 2015

(87) PCT Pub. No.: WO2014/199007
PCT Pub. Date: Dec. 18, 2014

(65) Prior Publication Data
US 2016/0130681 A1   May 12, 2016

(30) Foreign Application Priority Data

Jun. 10, 2013   (FI) ..................... 20135632

(51) Int. Cl.
*C22B 3/02* (2006.01)
*C02F 1/40* (2006.01)
(Continued)

(52) U.S. Cl.
CPC ............ *C22B 3/02* (2013.01); *B01D 11/0446* (2013.01); *B01D 17/0214* (2013.01);
(Continued)

(58) Field of Classification Search
CPC .... C22B 3/02; C22B 3/22; C22B 3/20; C22B 3/00; C22B 3/16; C22B 15/0065;
(Continued)

(56) References Cited

U.S. PATENT DOCUMENTS 4,119,539 A    10/1978 Ettel et al.
6,083,400 A     7/2000 Nyman et al.
(Continued)

FOREIGN PATENT DOCUMENTS

| CN | 201538801 U | 8/2010 |
|---|---|---|
| EP | 1 566 208 A1 | 8/2005 |
| WO | WO 2004/108245 A1 | 12/2004 |

OTHER PUBLICATIONS

Extended Search Report issued by the European Patent Office in corresponding European Patent Application No. 14810542.2 dated Feb. 17, 2017 (5 pages).

(Continued)

*Primary Examiner* — Lucas Stelling
*Assistant Examiner* — Angel Olivera
(74) *Attorney, Agent, or Firm* — Buchanan, Ingersoll & Rooney PC

(57) ABSTRACT

In a solvent extraction settler arrangement the outlet box comprises an inner tube arranged vertically inside a shaft, the inner tube being spaced from the side wall of the shaft to define an intermediate space between the inner tube and the shaft. The inner tube has an inner space and an opening at the lower part of the inner tube adjacent the bottom to form a flow path for the heavy solution phase to flow to the inner space. The shaft comprises a second outlet which is separate in relation to the discharge outlet and above the level of the discharge outlet. The second outlet opens through the side wall to the intermediate space at a location adjacent to the upper end of the shaft and at the level of said
(Continued)

layer of entrained light solution phase for discharging said layer of entrained light solution phase from the intermediate space.

3 Claims, 2 Drawing Sheets

(51) Int. Cl.
| | | |
|---|---|---|
| B01D 21/24 | (2006.01) | |
| B01D 21/02 | (2006.01) | |
| C22B 3/22 | (2006.01) | |
| B01D 17/02 | (2006.01) | |
| B01D 11/04 | (2006.01) | |
| C22B 3/20 | (2006.01) | |
| B01D 17/04 | (2006.01) | |
| C02F 103/16 | (2006.01) | |
| C22B 15/00 | (2006.01) | |
| C22B 3/16 | (2006.01) | |
| C22B 3/00 | (2006.01) | |

(52) U.S. Cl.
CPC ......... *B01D 21/10* (2013.01); *B01D 21/2444* (2013.01); *C02F 1/40* (2013.01); *C22B 3/20* (2013.01); *C22B 3/22* (2013.01); *B01D 17/0208* (2013.01); *B01D 17/0211* (2013.01); *B01D 17/04* (2013.01); *C02F 2103/16* (2013.01); *C22B 3/00* (2013.01); *C22B 3/16* (2013.01); *C22B 15/0065* (2013.01); *C22B 15/0082* (2013.01); *Y02P 10/234* (2015.11)

(58) Field of Classification Search
CPC .... C22B 15/0082; C02F 1/40; C02F 2103/16; B01D 21/2444; B01D 21/10; B01D 17/0214; B01D 11/0446; B01D 17/04; B01D 17/0208; B01D 17/0211; B01D 17/0217; Y02P 10/234
See application file for complete search history.

(56) References Cited

U.S. PATENT DOCUMENTS

| | | |
|---|---|---|
| 6,267,900 B1 | 7/2001 | Nyman et al. |
| 7,507,343 B2 | 3/2009 | San Lorenzo et al. |
| 7,731,853 B2 | 6/2010 | Ekman et al. |
| 2006/0131233 A1 | 6/2006 | Gigas et al. |
| 2008/0111096 A1 | 5/2008 | Veltri et al. |

OTHER PUBLICATIONS

Search Report dated Dec. 4, 2017, by the Chilean Patent Office in corresponding Chilean Patent Application No. 201503571. (1 page).
Office Action and Search Report dated Jan. 28, 2014, by the Finnish Patent Office in corresponding Finnish Patent Application No. 20135632. (5 pages).
International Search Report (PCT/ISA/210) dated Sep. 30, 2014, by the Finnish Patent Office as the International Searching Authority for International Application No. PCT/FI2014/050425.

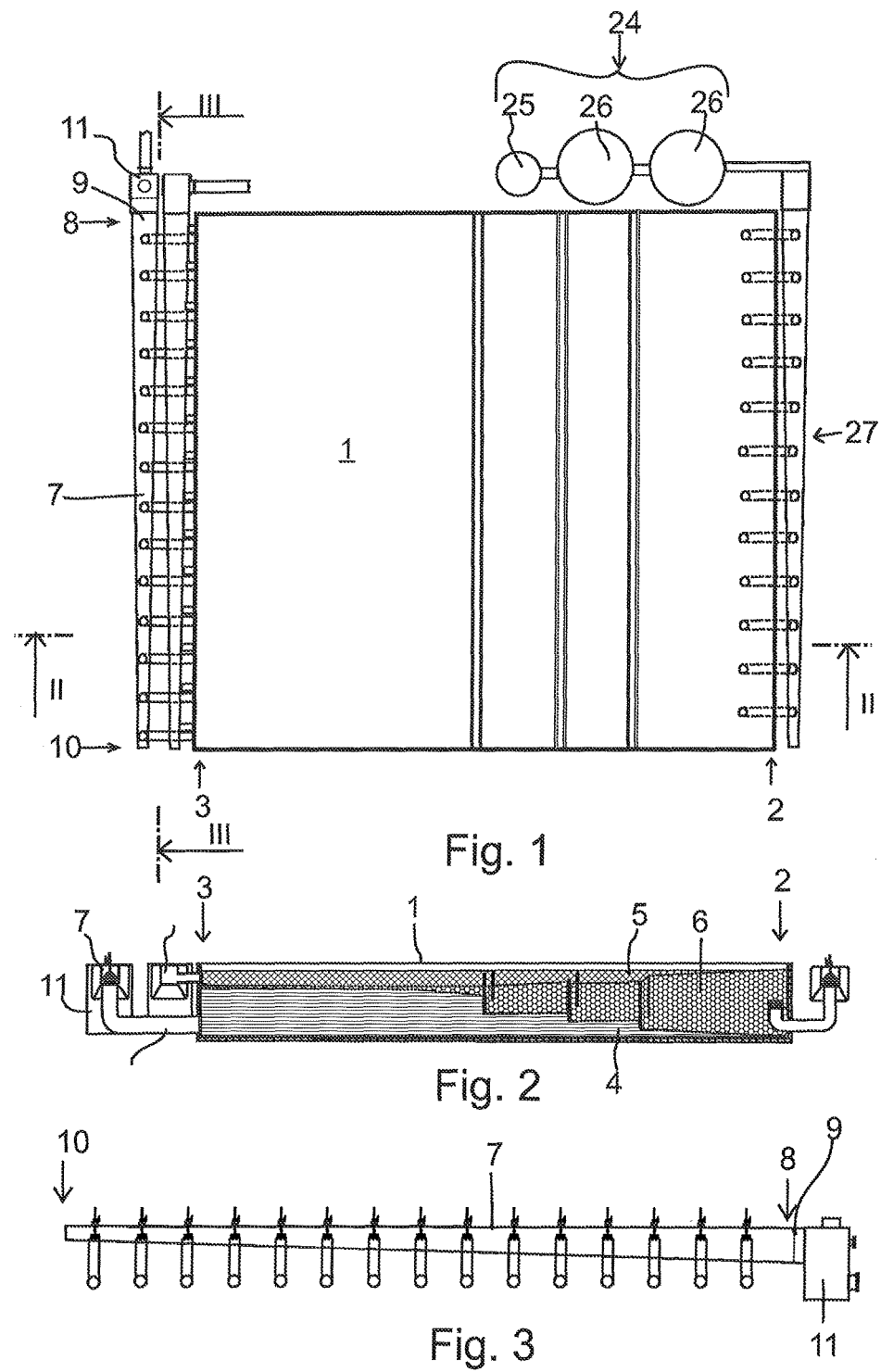

SOLVENT EXTRACTION SETTLER ARRANGEMENT

FIELD OF THE INVENTION

The present invention relates to a solvent extraction settler arrangement adapted for hydrometallurgical liquid-liquid extraction processes.

BACKGROUND OF THE INVENTION

As disclosed in e.g. publication U.S. Pat. No. 6,267,900 a solvent extraction settler arrangement is known which is adapted for hydrometallurgical liquid-liquid extraction processes and which typically comprises a mixing unit for preparing a dispersion from mutually immiscible solutions which include a heavy solution phase and a light solution phase. A settler tank is arranged to separate solution phases from a dispersion while the dispersion fed from the feed end flows to the discharge end of the settler tank. Elongated discharge launders are arranged at the discharge end of the settler to receive from the settler and discharge each solution phase that is separated from the dispersion in the settler. Each discharge launder includes a first end to which an outlet box is arranged and a closed second end.

One discharge launder is arranged at the discharge end of the settler for collecting and discharging the heavy solution phase which is separated as an underflow from the settler tank. The discharge launder includes a first end, a first outlet arranged at the first end, and a closed second end. An outlet box is connected to the first end of the discharge launder to receive the heavy solution phase flowing via the first outlet from the discharge launder. It may occur that on the surface of the heavy solution phase there is still a layer of entrained light solution phase. The outlet box comprises a vertical shaft defined by a side wall, a bottom and a top wall. Adjacent the upper part of the shaft there is an inlet or receiving the heavy solution phase together with said layer of entrained light solution phase flowing from the first outlet of the discharge launder. The outlet box also comprises a discharge outlet for discharging the heavy solution phase from the outlet box. The discharge outlet is located below the level of the inlet.

The entrained light solution phase (which is normally the organic phase) on the surface of the heavy solution phase (which is normally the aqueous phase) causes problems, if it is allowed to enter the next stage of the process. In a multi-stage solvent extraction process the most important process stage the outlet flow of which should not include any entrained organic phase impurities is the last extraction phase from where the outlet flow of the raffinate goes to a raffinate pond. Another process stage the outlet flow of which should not include entrained organic phase impurities is the stripping stage from where the outlet flow goes to the rich electrolyte tank to store the enriched electrolyte to be further lead to electrowinning. The entrained organic remains going further in the process also means additional costs because reagent losses must be replaced.

OBJECTIVE OF THE INVENTION

The objective of the invention is to eliminate the disadvantages mentioned above.

In particular, it is the objective of the invention to provide a settler arrangement wherein the outlet box is so configured that it is able to extract the layer of the light solution phase from the surface of the heavy solution phase.

SUMMARY OF THE INVENTION

According to an aspect of the invention, the present invention provides a solvent extraction settler arrangement adapted for hydrometallurgical liquid-liquid extraction processes, comprising a settler tank having a feed end and a discharge end which is opposite and at a distance in relation to the feed end, said settler tank being arranged to separate solution phases from a dispersion of said phases comprising a heavy solution phase and a light solution phase, while said dispersion fed from the feed end flows to the discharge end. The settler arrangement further comprises a discharge launder arranged at the discharge end of the settler for collecting and discharging the heavy solution phase having a layer of entrained light solution phase on the surface of the heavy solution phase, separated as an underflow from the dispersion, the discharge launder including a first end, a first outlet arranged at the first end, and a closed second end. The settler arrangement further comprises an outlet box connected to the first end of the discharge launder to receive the heavy solution phase flowing via the first outlet from the discharge launder, the outlet box comprising a vertical shaft defined by a side wall, a bottom and a top wall. The outlet box further comprises an inlet adjacent the upper part of the shaft for receiving the heavy solution phase together with said entrained layer of light solution phase flowing from the first outlet of the discharge launder, and a discharge outlet for discharging the heavy solution phase from the shaft, said discharge outlet being located below the level of the inlet.

In accordance with the invention the outlet box comprises an inner tube arranged vertically inside the shaft and to extend from the bottom through and above the top wall, the inner tube being spaced from the side wall of the shaft to define an intermediate space between the inner tube and the vertical shaft. The inner tube has an inner space and an opening at the lower part of the inner tube adjacent the bottom to form a flow path for the heavy solution phase to flow from the intermediate space to the inner space. The inner tube further has an outlet above the opening, said outlet being said discharge outlet for discharging the heavy solution phase from the outlet box. The shaft comprises a second outlet which is separate in relation to the discharge outlet and above the level of the discharge outlet and which second outlet opens through the side wall to the intermediate space at a location adjacent to the upper end of the shaft and at the level of said layer of entrained light solution phase for discharging said layer of entrained light solution phase from the intermediate space, whereby the heavy solution phase is discharged via the discharge outlet and the layer of entrained light solution phase is discharged via the second outlet.

The advantage of the invention is that the outlet box traps and separates the light solution phase thereby preventing the light solution phase to end up to the next process stage together with the outlet flow of the heavy solution phase. The structure of the outlet box also prevents aeration of the heavy solution phase.

In one embodiment of the settler arrangement, the heavy solution phase is an aqueous phase and the light solution phase is an organic phase. If the settler arrangement is the last extraction stage before the raffinate pond, then with the aid of the improved outlet box design in this stage the organic impurities do not enter from the last extraction stage to the raffinate pond. If the settler arrangement is a stripping stage, then with the aid of the improved outlet box for the aqueous solution phase in this stage the organic impurities do not enter with the enriched electrolyte to the electrowinning process.

In one embodiment of the settler arrangement, the inner tube comprises a lid arranged at the upper end of the inner tube, said lid having an openable and closable cover to provide access to the inner space of the inner tube. Pure and representative samples of the heavy solution phase can be easily taken from the heavy solution phase flowing through the inner space of the inner tube.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings:

FIG. 1 shows a plan view of a solvent extraction settler arrangement according to an embodiment of the invention, FIG. 2 shows a section II-II from FIG. 1, FIG. 3 shows a section III-III from FIG. 1.

DETAILED DESCRIPTION OF THE INVENTION

Figure 4:
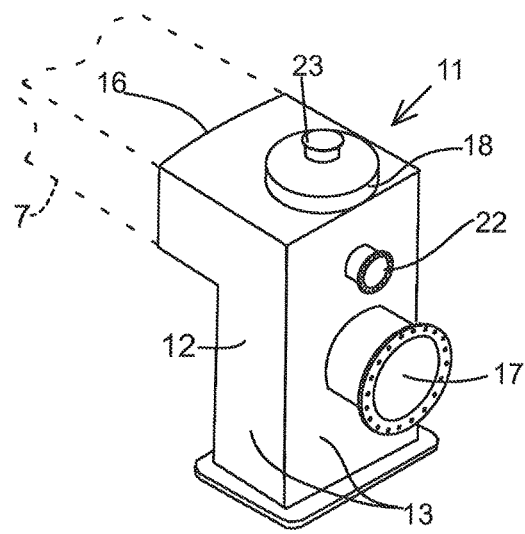
FIG. 4 shows an axonometric view of an embodiment of the outlet box of the settler arrangement according to the invention.

FIGS. 1 and 2 show a solvent extraction settler arrangement which is adapted for hydrometallurgical liquid-liquid solvent extraction processes.

The settler arrangement comprises a mixing unit 24 for preparing a dispersion from mutually immiscible solutions. The mixing unit 24 includes, in this case, a pumping unit 25 and two mixers 26. A settler tank 1 is arranged to separate solution phases 4, 5 from a dispersion 6 which is fed from the feed end 2 while the dispersion flows towards the discharge end 3 which is opposite and at a distance in relation to the feed end. A feeding device 27 is arranged at the feed end 2 for feeding the dispersion prepared by the mixing unit 24 to the settler tank 1. Although in the embodiment shown in FIG. 1 the settler tank 1 consists of one large tank which has a single uniform flow space which extends widthwise over the whole area of the tank and lengthwise from the feed end 2 to the discharge end 3. In another not-shown embodiment the settler tank may consist of a plurality of widthwise mutually separated elongated parallel settler tank sections each extending from the feed end to the discharge end and forming a plurality of parallel flow spaces.

Figure 5:
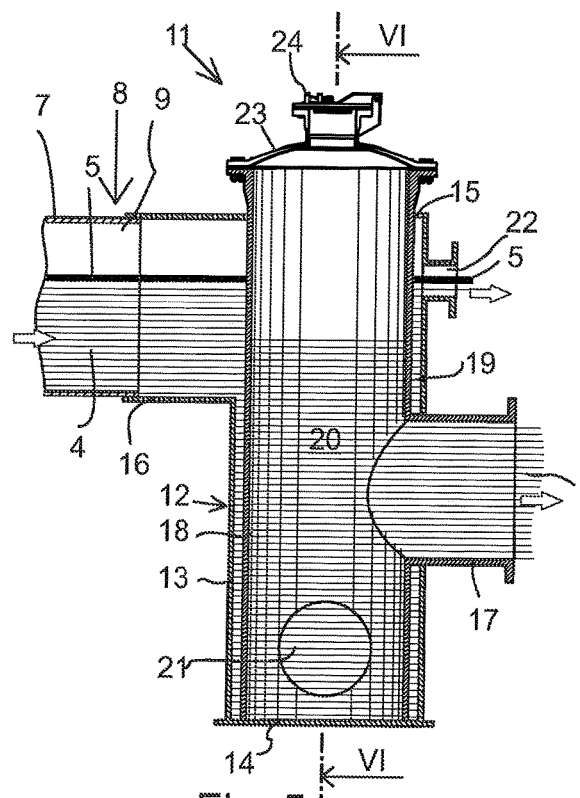
FIG. 5 shows a cross-sectional side view of the outlet box of FIG. 4 connected to the first end of the discharge launder.
Figure 6:
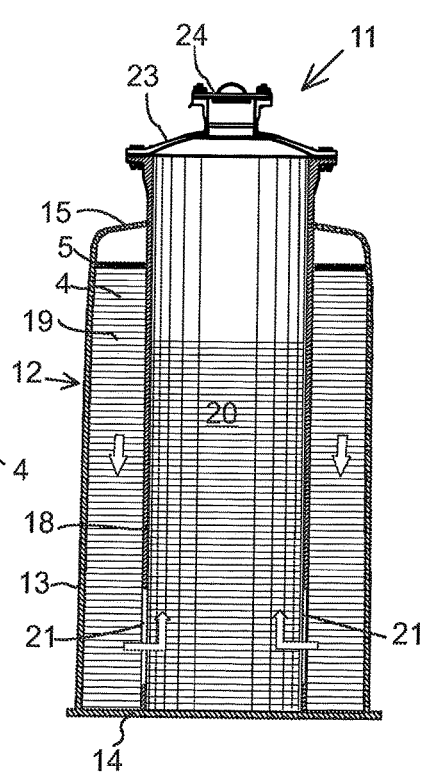
FIG. 6 shows a cross-section VI-VI from FIG. 5.

Elongated discharge launders 7 and 28 are arranged at the discharge end 3 to collect and discharge the separated solutions further in the process. The discharge launders include a discharge launder 28 for receiving a separated light solution phase (typically organic solution phase) as an overflow from the settler tank 1, and a discharge launder 7 arranged beside and in parallel with the discharge launder 28. The discharge launder 7 is for receiving a separated heavy solution phase (typically aqueous solution phase) from the settler tank 1 as an underflow. The discharge launder 7 includes a first end 8, a first outlet 9 at the first end 8, and a closed second end 10. The heavy solution phase 4 which flows in the discharge launder 7 out from the first outlet 9 has a layer of entrained light solution phase 5 on the surface of the heavy solution phase 4, as shown in FIG. 5.

As shown in FIGS. 1, 3, 4 and 5, an outlet box 11 is connected to the first end 8 of the discharge launder 7 to receive the heavy solution phase 4 having a layer of entrained light solution phase 5 on the surface of the heavy solution phase 4 flowing via the first outlet 9 from the discharge launder 7. The outlet box 11 comprises a vertical shaft 12 which is defined by a side wall 13, a bottom 14 and a top wall 15. The outlet box 11 further comprises an inlet 16 adjacent the upper part of the shaft for receiving the heavy solution phase 4 together with said layer of entrained light solution phase 5 flowing from the first outlet 9 of the discharge launder 7. A discharge outlet 17 is arranged for discharging the heavy solution phase out from the outlet box 11. The discharge outlet is located below the level of the inlet 16.

The outlet box 11 comprises an inner tube 18 which is arranged vertically inside the shaft 12. The inner tube 18 extends from the bottom 14 to through the top wall 15. The inner tube 18 has a diameter smaller than the shaft 12 so that the inner tube 18 is spaced from the side wall 13 of the shaft 12 to define an intermediate space 19 between the inner tube 18 and the shaft 12. The inner tube 18 has an inner space 20 and an opening 21 at the lower part of the inner tube 18 adjacent the bottom 14. The opening 21 in the wall of the inner tube 18 forms a flow path for the heavy solution phase 4 to flow from the intermediate space 19 to the inner space 20 of the inner tube 18. The inner tube 18 has a discharge outlet 17 above the opening 21. The heavy solution phase 4 can be discharged from the outlet box through the discharge outlet 17.

Further, the shaft 12 comprises a second outlet 22 which is separate in relation to the discharge outlet 17 and above the level of the discharge outlet 17. The second outlet 22 opens through the side wall 13 to the intermediate space 19 at a location adjacent to the upper end of the shaft 12. The second outlet 22 is arranged at the level of the layer of entrained light solution phase 5 so that it can flow out through the second outlet 22 from the intermediate space 19 at that level. The heavy solution phase 4 is discharged via the discharge outlet 17 while the layer of entrained light solution phase 5 is discharged via the second outlet 22.

In order to facilitate sampling of the heavy solution phase 4 from the inner space 20, the inner tube 18 comprises a lid 23 arranged at the upper end of the inner tube. The lid 23 has a cover 24 which can be opened and closed. In an opened state the cover 24 reveals access to the inner space 20 of the inner tube 18.

The above-described structure of the outlet box 11 also prevents formation of air bubbles. Therefore, the outlet flow of the heavy solution phase from the discharge outlet 17 does not contain air bubbles. Therefore the air bubbles do not enter the pump/mixer unit of the next solvent extraction stage. The problems relating to the crud and mist formation and reduction of the lifetime of the reagent due to the air bubbles are avoided.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A solvent extraction settler arrangement adapted for hydrometallurgical liquid-liquid extraction processes, comprising a settler tank having a feed end and a discharge end which is opposite and at a distance in relation to the feed end, said settler tank being arranged to separate solution phases from a dispersion of said phases comprising a heavy solution phase and a light solution phase, while said dispersion fed from the feed end flows to the discharge end, a discharge launder arranged at the discharge end of the settler for collecting and discharging the heavy solution phase, having a layer of entrained light solution phase on the surface of the heavy solution phase, separated as an underflow from the dispersion, the discharge launder including a first end, a first outlet arranged at the first end, and a closed second end, and an outlet box connected to the first end of the discharge launder to receive the heavy solution phase flowing via the first outlet from the discharge launder, the outlet box comprising a vertical shaft defined by a side wall, a bottom and a top wall, an inlet adjacent the upper part of the shaft for receiving the heavy solution phase together with said layer of entrained light solution phase flowing from the first outlet of the discharge launder, and a discharge outlet for discharging the heavy solution phase from the outlet box, said discharge outlet being located below the level of the inlet, wherein the outlet box comprises an inner tube arranged vertically inside the shaft and to extend from the bottom to through and above the top wall, said inner tube being spaced from the side wall of the shaft to define an intermediate space between the inner tube and the vertical shaft, the inner tube having an inner space and an opening at the lower part of the inner tube adjacent the bottom to form a flow path for the heavy solution phase to flow from the intermediate space to the inner space, and the inner tube having an outlet above the opening, said outlet being said discharge outlet for discharging the heavy solution phase from the outlet box, and that the shaft comprises a second outlet which is separate in relation to the discharge outlet and above the level of the discharge outlet, and which second outlet opens through the side wall to the intermediate space at a location adjacent to the upper end of the shaft and at the level of said layer of entrained light solution phase for discharging said layer of entrained light solution phase from the intermediate space, whereby the heavy solution phase is discharged via the discharge outlet and the layer of entrained light solution phase is discharged via the second outlet.

2. The settler arrangement according to claim 1, wherein the heavy solution phase is an aqueous phase and the light solution phase is an organic phase.

3. The settler arrangement according to claim 1, wherein the inner tube comprises a lid arranged at the upper end of the inner tube, said lid having an openable and closable cover to provide access to the inner space of the inner tube.

* * * * *